US008045054B2

(12) United States Patent
Bishop et al.

(10) Patent No.: US 8,045,054 B2
(45) Date of Patent: Oct. 25, 2011

(54) CLOSED CAPTIONING LANGUAGE TRANSLATION

(75) Inventors: William Bishop, Raleigh, NC (US); M. Neil Harrington, Raleigh, NC (US); Steve J. McKinnon, Cary, NC (US)

(73) Assignee: Nortel Networks Limited, Mississauga, Ontario (CA)

( * ) Notice: Subject to any disclaimer, the term of this patent is extended or adjusted under 35 U.S.C. 154(b) by 1442 days.

(21) Appl. No.: 11/531,562

(22) Filed: Sep. 13, 2006

(65) Prior Publication Data

US 2008/0066138 A1    Mar. 13, 2008

(51) Int. Cl.
*H04N 7/00* (2006.01)
*H04N 11/00* (2006.01)

(52) U.S. Cl. ........................................ 348/468; 704/277
(58) Field of Classification Search .................. 348/465, 348/468, 478, 564, 552; 725/137; 455/3.06, 455/556.1, 556.2; 704/2, 3, 8, 272, 277
See application file for complete search history.

(56) References Cited

U.S. PATENT DOCUMENTS

| 5,457,542 | A | 10/1995 | Kim |
| 5,982,448 | A | 11/1999 | Reyes |
| 7,054,804 | B2 | 5/2006 | Gonzales et al. |
| 7,130,790 | B1 | 10/2006 | Flanagan et al. |
| 7,571,455 | B2 * | 8/2009 | Lee ................................ 725/109 |
| 2002/0101537 | A1 * | 8/2002 | Basson et al. ................. 348/465 |
| 2005/0075857 | A1 * | 4/2005 | Elcock et al. ..................... 704/2 |
| 2007/0143103 | A1 * | 6/2007 | Asthana et al. ............... 704/200 |
| 2007/0244688 | A1 * | 10/2007 | Bangalore et al. ................ 704/3 |

FOREIGN PATENT DOCUMENTS

| JP | 2000092460 A2 | 3/2000 |
| WO | 03/081917 A1 | 10/2003 |

OTHER PUBLICATIONS

International Search Report for PCT/IB2007/002623, mailed Feb. 27, 2008.
Supplementary European Search Report for European Patent Appl. No. 07825094.1, dated Dec. 3, 2009.

* cited by examiner

*Primary Examiner* — Victor Kostak
(74) *Attorney, Agent, or Firm* — Withrow & Terranova, PLLC

(57) ABSTRACT

The present invention provides an architecture for translating closed captioning text originally provided with a video program from one language to another and presenting the translated closed captioning text with the video program to a viewer. As such, the viewers are able to receive the closed captioning text in languages other than that used for the closed captioning originally provided with the video program. The original closed captioning text may be translated from one language to another by a centralized closed captioning processor, such that the customer equipment for various subscribers can take advantage of centralized translation services. Once the original closed captioning text is translated, the translated closed captioning text may be delivered to the customer equipment in different ways.

20 Claims, 7 Drawing Sheets

CLOSED CAPTIONING LANGUAGE TRANSLATION

FIELD OF THE INVENTION

The present invention relates to closed captioning, and in particular to translating closed captioning text provided in a first language into a second language, wherein the translated closed captioning text is presented to a viewer along with the corresponding video.

BACKGROUND OF THE INVENTION

Closed captioning allows deaf, hard of hearing, and hearing impaired people to read a transcript of an audio portion of a television, video, or film presentation. As the video is presented to the viewer, text captions are displayed identifying who is speaking, transcribing what is being said, and indicating relevant sounds, such as laughing, crying, crashes, explosions, and the like. Closed captioning is also used to assist people who are learning an additional language, learning to read, or for those in a noisy environment.

For the present disclosure, television, video, and film presentations are referred to as "video," and the text captions representing the closed captioning of the video are referred to as "closed captioning text." Closed captioning text is encoded into the video using any number of closed captioning techniques. In many instances, different types of video programming employ different types of closed captioning encoding and decoding.

In North America, National Television Systems Committee (NTSC)-based programming encodes closed captioning text into line 21 of the vertical blanking interval. The vertical blanking interval is a portion of the analog television picture that resides just above the visible portion of the video, and is not seen by the viewer. The viewer's set-top box or television is able to decode the encoded closed captioning text provided in line 21 of the vertical blanking interval and present it to the viewer in association with the video. For digital television, the Advanced Television Systems Committee (ATSC)-based programming encodes three data streams into the video to support closed captioning. One of the streams can support up to 63 unique closed captioning streams, which are encoded in an EIAA-708 format as set forth by the Electronic Industries Alliance (EIA). The other two streams are encoded such that when the digital video is converted to analog video, the closed captioning text appears as encoded closed captioning in line 21 of the vertical blanking interval. Outside of North America, Phase Alternation Line (PAL) and Sequential Color With Memory (SCCAM) video standards transmit and store closed captioning information in a different manner, but the overall result is the same.

Regardless of the encoding and delivery technique, closed captioning is extremely beneficial in providing a transcript of an audio portion of a video program. Unfortunately, closed captioning text is generally only available in one language, although most closed captioning standards support different closed captioning streams for different languages. However, the significant effort and expense associated with providing closed captioning generally limits the closed captioning text to the most prevalent language in which the video will be presented. In the United States, for example, closed captioning is generally only provided in English, even though there are significant Hispanic, Asian, and European contingents who would benefit from closed captioning in their native languages.

Accordingly, there is a need for a way to efficiently and effectively translate closed captioning text presented in a first language into a second language, and make the translated closed captioning text available to viewers of the associated video.

SUMMARY OF THE INVENTION

The present invention provides an architecture for translating closed captioning text originally provided with a video program from one language to another and presenting the translated closed captioning text with the video program to a viewer. As such, the viewers are able to receive the closed captioning text in a language other than that used for the closed captioning originally provided with the video program. The original closed captioning text may be translated from one language to another by a centralized closed captioning processor, such that the customer equipment for various subscribers can take advantage of centralized translation services. Once the original closed captioning text is translated, the translated closed captioning text may be delivered to the customer equipment in different ways.

In a first embodiment, the video program is sent to the closed captioning processor and the customer equipment at the same time. The closed captioning processor will translate the original closed captioning text from one language to another. After translation, the closed captioning processor will deliver the translated closed captioning text to the customer equipment, which will present the translated closed captioning text with the video program.

In another embodiment, the video program is initially sent to the closed captioning processor. The closed captioning processor will translate the original closed captioning text from one language to another. After translation, the closed captioning processor will encode the translated closed captioning text into the video program as closed captioning. The closed captioning processor will then deliver the video program with the new closed captioning content to the customer equipment, which will recover the translated closed captioning text using traditional closed captioning decoding techniques.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides an architecture for translating closed captioning (CC) text originally provided with a video program from one language to another and presenting the translated closed captioning text with the video program to a viewer. As such, the viewers are able to receive the closed captioning text in a language other than that used for the closed captioning originally provided with the video program. The original closed captioning text may be translated from one language to another by a centralized closed captioning processor, such that the customer equipment for various subscribers can take advantage of centralized translation services. Once the original closed captioning text is translated, the translated closed captioning text may be delivered to the customer equipment in different ways. In a first embodiment, the video program is sent to the closed captioning processor and the customer equipment at the same time. The closed captioning processor will translate the original closed captioning text from one language to another. After translation, the closed captioning processor will deliver the translated closed captioning text to the customer equipment, which will present the translated closed captioning text with the video program.

In another embodiment, the video program is initially sent to the closed captioning processor. The closed captioning processor will translate the original closed captioning text from one language to another. After translation, the closed captioning processor will encode the translated closed captioning text into the video program as closed captioning. The closed captioning processor will then deliver the video program with the new closed captioning content to the customer equipment, which will recover the translated closed captioning text using traditional closed captioning decoding techniques.

In either embodiment, any number of translations may be provided for original closed captioning text. The translation process and the desired translation or translations may be requested by the customer equipment, the service provider, or another subscriber device. The video program may be provided in an analog or digital format via broadcast or recorded medium.

Figure 1:
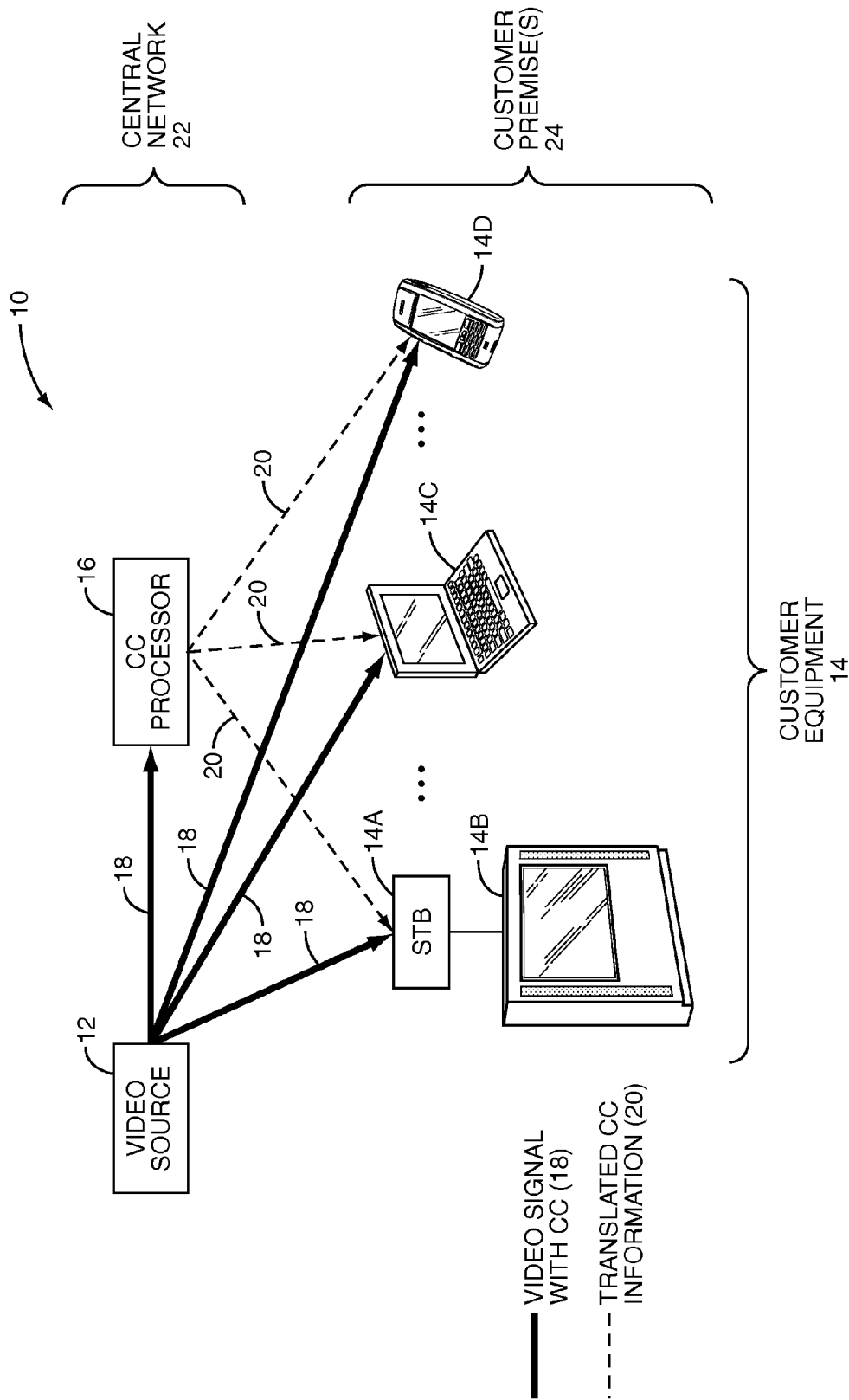
FIG. 1 is a block representation of a closed captioning architecture according to a first embodiment of the present invention.

With reference to FIG. 1, a closed captioning translation architecture is illustrated according to a first embodiment of the present invention. The closed captioning translation architecture 10 includes a video source 12 capable of delivering video programs to various customer equipment 14, which may be associated with different subscribers at different locations. The customer equipment 14 may take various forms, including a set-top box (STB) 14A, an associated television or monitor 14B, a personal computer (PC) 14C, as well as any other mobile device, such as a personal digital assistant (PDA) 14D or mobile telephone (not shown). The video programs that require closed captioning translation are also sent to a closed captioning (CC) processor 16 at the same time they are being sent to the customer equipment 14.

In FIG. 1, video programs are delivered to the customer equipment 14 and the CC processor 16 via an appropriate video signal 18, which provides closed captioning in a first language. The CC processor 16 will translate the closed captioning text to a second language and will provide corresponding translated CC information 20 to the appropriate customer equipment 14, as indicated above. To reduce the computational requirements of the customer equipment 14, and to minimize delays associated with translating closed captioning text from one language to another, the CC processor 16 is provided in a central network 22. As such, the CC processor 22 is separate from the customer equipment 14. Preferably, the CC processor 16 is able to provide translation services to customer equipment 14 at numerous customer premises 24.

Figure 2:
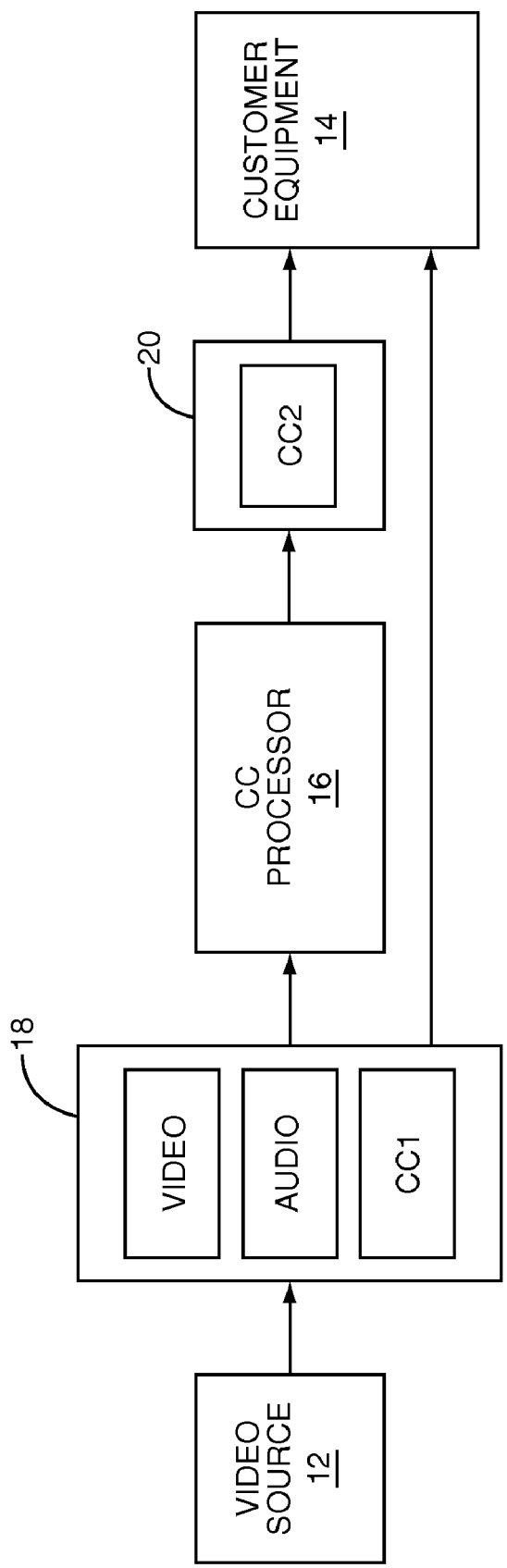
FIG. 2 is a block representation of a closed captioning translation process according to the embodiment of FIG. 1.

FIG. 2 illustrates a simplified block representation of the closed captioning translation architecture of the embodiment illustrated in FIG. 1. As illustrated, a video source 12 will simultaneously provide the video signal 18 for the video program to the CC processor 16 and the customer equipment 14. The video signal 18 will have a video, audio, and closed captioning component having closed captioning text (CC1), regardless of the signal type or closed captioning encoding technique.

Figure 3:
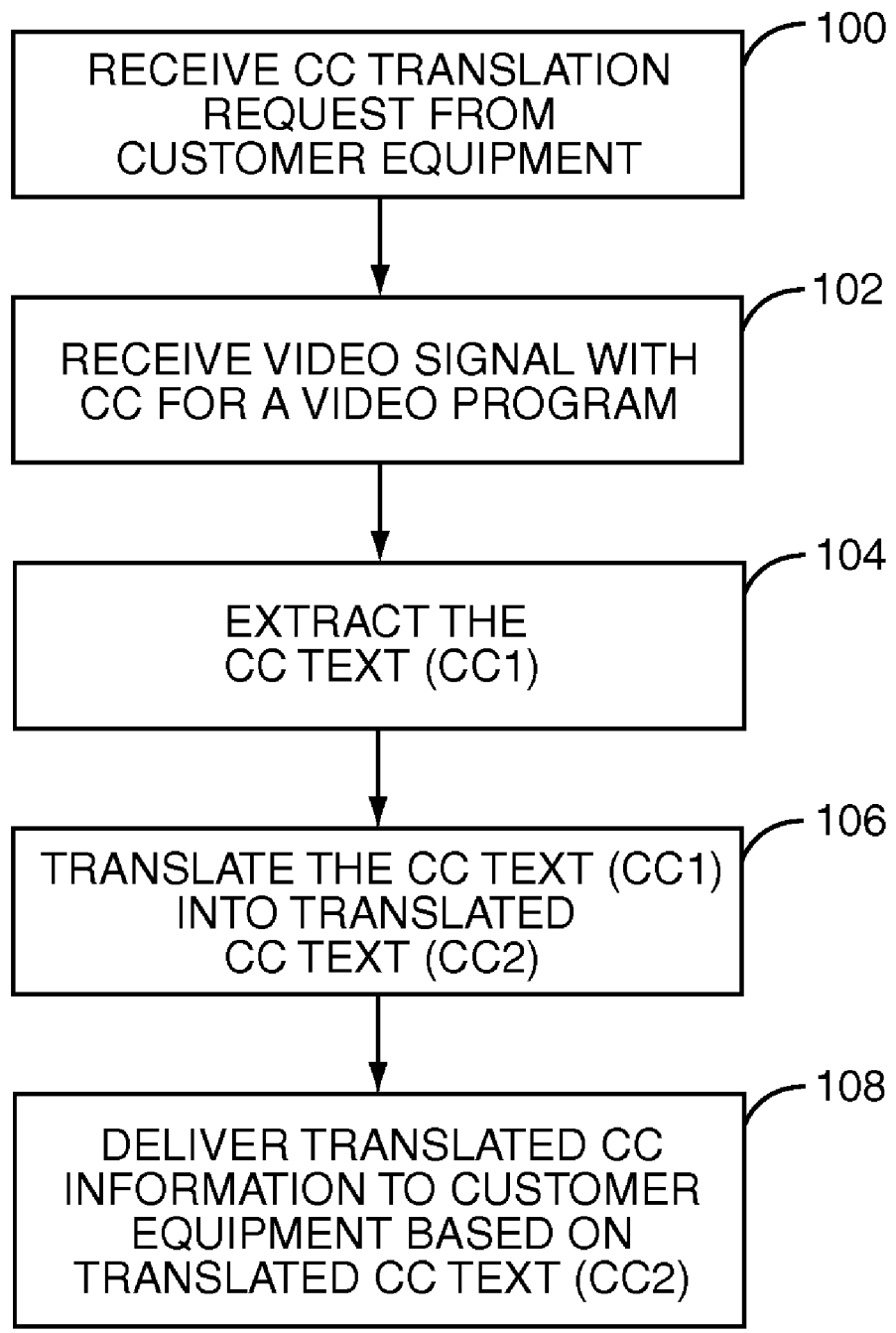
FIG. 3 is a flow diagram illustrating the closed captioning translation process according to the embodiment of FIG. 1.

With reference to FIG. 3, operation of the CC processor 16 is illustrated. The CC processor 16 may receive a CC translation request from the customer equipment 14 to identify a language to which the closed captioning text (CC1) provided in the video signal 18 should be translated (step 100). The CC processor 16 will then receive the video signal 18 with the original closed captioning for the video program (step 102), and extract the original closed captioning text (CC1) from the video signal 18 using the appropriate closed captioning decoding techniques (step 104). Once the original closed captioning text (CC1) is extracted, the CC processor 16 will translate the original closed captioning text from one language to another to create translated closed captioning text (CC2) (step 106). The translated closed captioning text is delivered to the customer equipment 14 in translated closed captioning information 20, which is based on the translated closed captioning text (step 108), as also illustrated in FIG. 2.

Translation of the closed captioning text may be provided using different techniques. For example, the translation may be provided on a word-by-word or phrase-by-phrase basis. Alternatively, the closed captioning text over a certain period of time may be accumulated and then translated as an entire segment. The particular type of translation is beyond the scope of the present invention, and those skilled in the art will recognize various translation techniques that will be beneficial in various video delivery environments.

In one embodiment, the translated closed captioning information is not re-encoded into a closed captioning format, and is sent to the customer equipment 14 without the video or audio components of the video program. The translated closed captioning information 20 is formatted such that the customer equipment 14 can readily recover the translated closed captioning text (CC2) and overlay the text on the video program being presented to the viewer. The overlay procedure may be configured to emulate traditional closed captioning, or may be presented in any desired fashion. Notably, the customer equipment 14 need not have closed captioning decoding capabilities, since the translated closed captioning information is not necessarily provided in a closed captioning format, although it represents a translation of the original closed captioning text (CC1).

Since the translated closed captioning text (CC2) is being delivered to the customer equipment 14 in the translated closed captioning information 20 separately from the video signal 18, steps must be taken to synchronize the presentation of the translated closed captioning text (CC2) with the video of the video program. In the translated closed captioning information 20, the CC processor 16 may provide markers or like synchronization information corresponding to the video in the video program, such that the translated closed captioning text is presented at the appropriate time and rate in association with the video of the video program. Alternatively, the customer equipment 14 and the CC processor 16 may periodically or continuously communicate with each other to ensure that the translated closed captioning text (CC2) is presented to the viewer along with the video of the video program in a synchronized fashion.

The CC processor 16 will inevitably inject some delay in presenting the translated closed captioning text (CC2) to the customer equipment 14. The customer equipment 14 may employ at least a video buffer to buffer the video of the video program for a time sufficient to receive the translated closed captioning text (CC2) from the CC processor 16. The synchronization information in the closed captioning text will control the amount of buffering. The customer equipment 14 will then present the translated closed captioning text (CC2) and the video of the video program in a synchronized fashion to the viewer.

Given the centralized nature of the CC processor 16, any customer equipment 14 may receive translation services. Further, the CC processor 16 may be configured to translate between any number of languages, such that closed captioning text may be translated into any number of languages and may be presented to any amount of customer equipment 14 in an effective and efficient manner. Preferably, the customer equipment 14 is able to request a particular type of translation for a particular video program or for all programming in light of the viewer's needs or desires.

Figure 4:
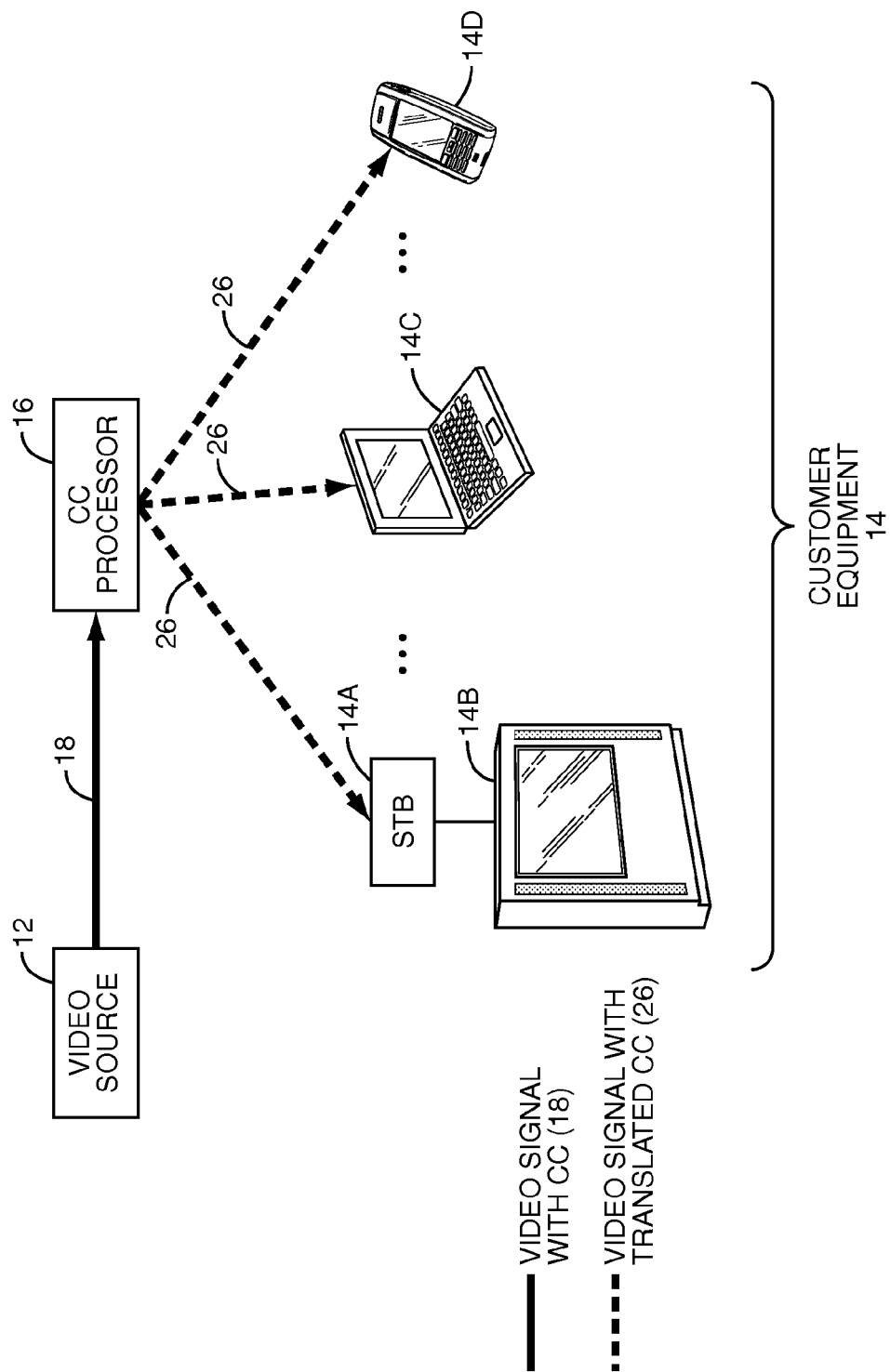
FIG. 4 is a block representation of a closed captioning architecture according to a second embodiment of the present invention.

With reference to FIG. 4, an alternative closed captioning translation architecture is provided. As illustrated, the video signal 18 is sent to the CC processor 16 from the video source 12. The video signal 18 is not directly delivered to the customer equipment 14 when closed captioning translation services are employed. Instead, the CC processor 16 will extract the closed captioning text from the video signal 18, translate the closed captioning text from one language to another, and encode translated closed captioning text into the video signal 18 as traditional closed captioning. The CC processor 16 will then deliver a video signal 26 having closed captioning with the translated closed captioning text to the customer equipment 14.

Figure 5:
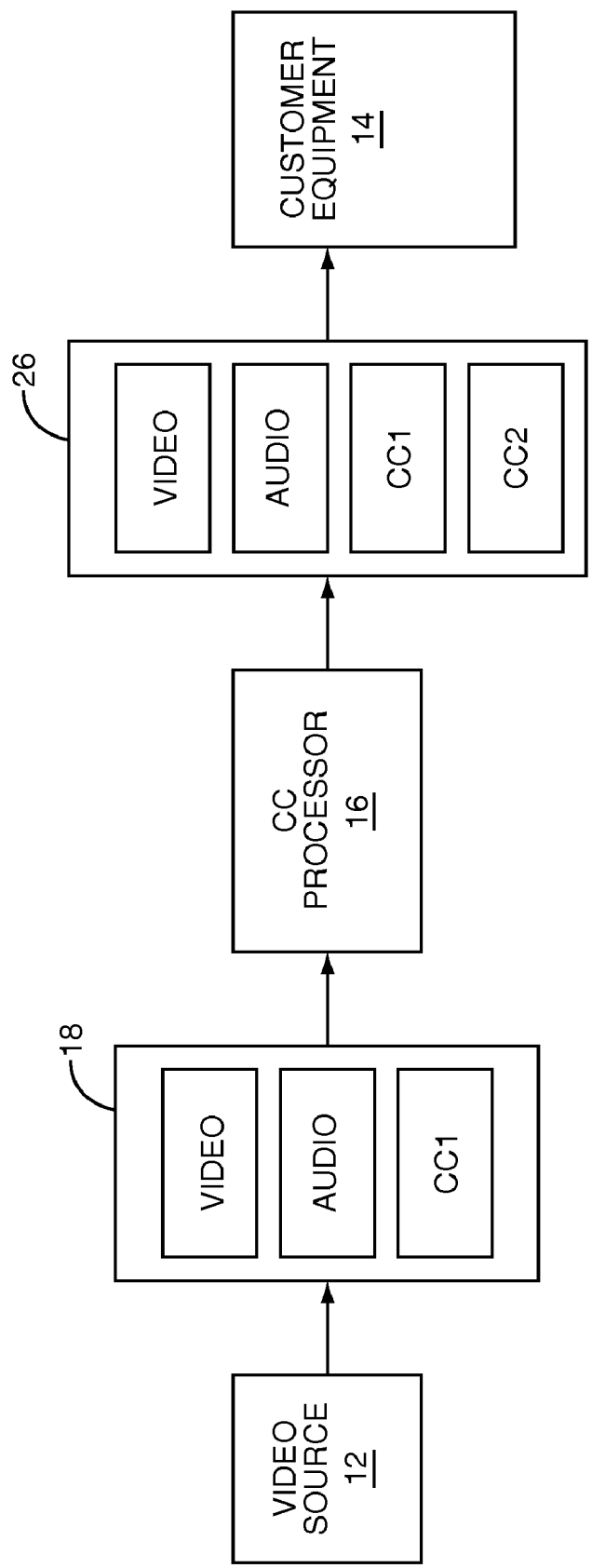
FIG. 5 is a block representation of a closed captioning translation process according to the embodiment of FIG. 4.

This process is further illustrated in FIG. 5. Notably, the CC processor 16 presents video, audio, and closed captioning aspects of the video program in the video signal 26 to the customer equipment 14. Notably, the translated closed captioning text (CC2) may replace the closed captioning text (CC1) that was provided in the original video signal 18, or may be added in a separate closed captioning field, as illustrated. Upon receipt of the video signal 26, the customer equipment 14 may use traditional closed captioning decoding techniques to present the translated closed captioning text CC2 or original closed captioning text CC1 to the viewer.

Unlike the previous embodiment where the translated closed captioning text (CC2) required a different process to overlay the translated closed captioning text on the video of the video program, this embodiment embeds translated closed captioning text into the video signal 26 prior to the customer equipment 14 receiving the video signal 26. This embodiment is particularly beneficial in environments where the customer equipment 14 is not configured to receive translated closed captioning information via a separate source and overlay the corresponding translated closed captioning text (CC2) over the video of the video signal 18. However, this embodiment requires that the customer equipment 14 have closed captioning decoding capabilities.

Figure 6:
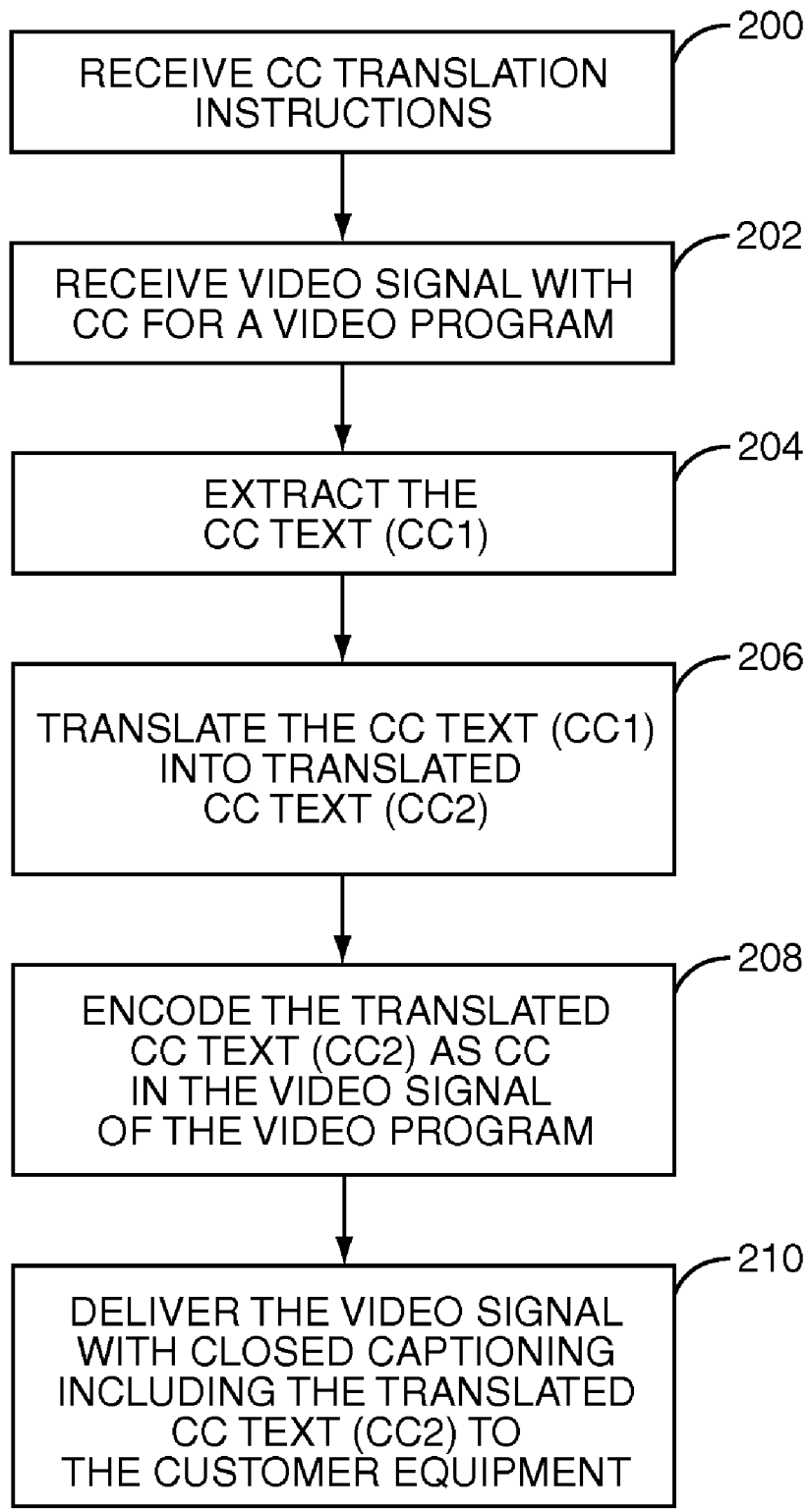
FIG. 6 is a flow diagram illustrating the closed captioning translation process according to the embodiment of FIG. 4.

With reference to FIG. 6, operation of the CC processor 16 is provided according to the second embodiment. Initially, the CC processor 16 may receive closed captioning translation instructions from the customer equipment 14, a service provider, or a subscriber via another piece of customer equipment 14 (step 200). The instructions may identify a desired language for closed captioning, as well as the video program or programs for which closed captioning translation services are desired. The CC processor 16 may then receive a video signal with closed captioning for a video program (step 202). Again, the closed captioning will include closed captioning text (CC1) in a first language. The CC processor 16 will extract the closed captioning text (CC1) (step 204) and translate the closed captioning text (CC1) into translated closed captioning text (CC2) (step 206). The translated closed captioning text is then encoded into the video signal 18 of the video program using appropriate closed captioning encoding techniques (step 208). The CC processor 16 will deliver the resultant video signal 26 to the customer equipment 14 (step 210). Again, the video signal 26 will have closed captioning including the translated closed captioning text (CC2), and perhaps the original closed captioning text (CC1).

In this embodiment, synchronization of the translated closed captioning text (CC2) with the video of the video program is provided in the CC processor 16 during the closed captioning encoding process. The customer equipment 14 will simply decode the appropriate closed captioning stream, which includes the translated closed captioning text (CC2), and present the translated closed captioning text (CC2) to the viewer along with the video in traditional fashion.

Those skilled in the art will recognize that different closed captioning encoding and decoding techniques are available and known in the art. In light of the different closed captioning processes and the various manners in which video programs may be recorded, broadcast, or delivered to customer equipment 14, the concepts of the present invention may take corresponding forms, as will be appreciated by those skilled in the art.

Figure 7:
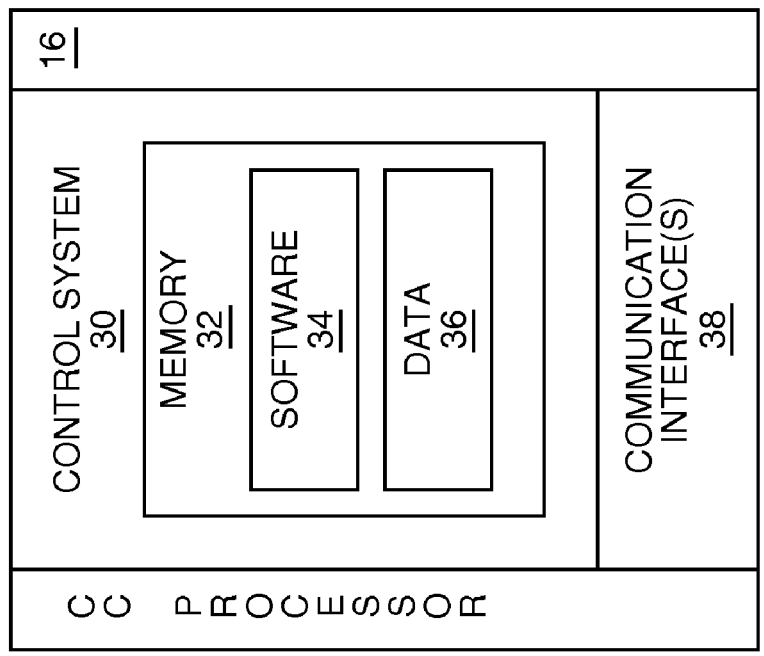
FIG. 7 is a block representation of a closed captioning processor according to one embodiment of the present invention.

With reference to FIG. 7, a block representation of a CC processor 16 is illustrated. The CC processor 16 may include a control system 30 associated with sufficient memory 32 for the requisite software 34 and data 36 to operate as described above. The control system 30 may also be associated with one or more communication interfaces 38 to facilitate communications directly or indirectly with the video source 12 and the customer equipment 14.

Figure 8:
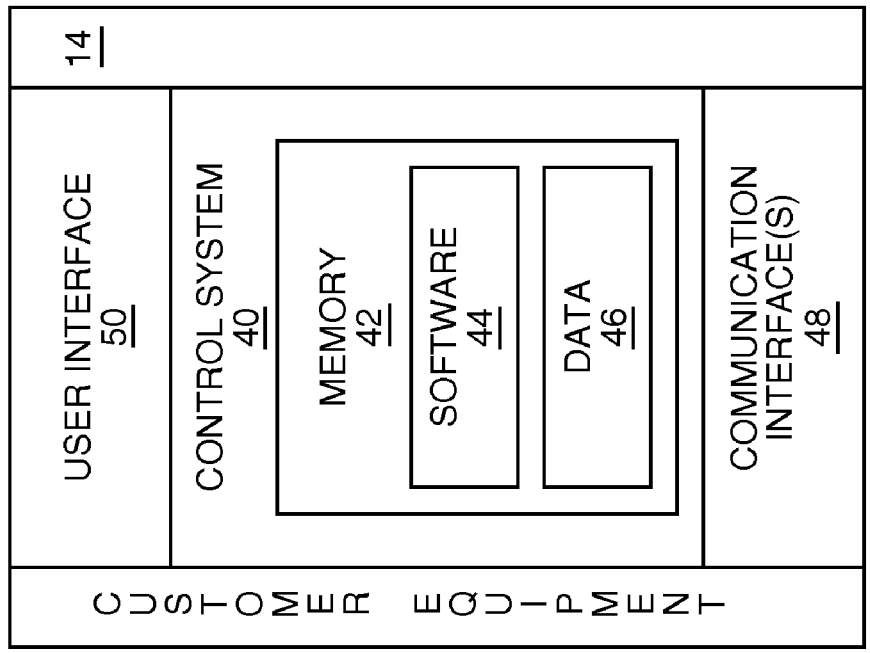
FIG. 8 is a block representation of customer equipment according to one embodiment of the present invention.

A block representation of customer equipment 14 is provided in FIG. 8. The customer equipment 14 may include a control system 40 having sufficient memory 42 for the requisite software 44 and data 46 to operate as described above. The control system 40 may also be associated with one or more communication interfaces 48 to facilitate communications with other communication equipment 14, the CC processor 16, and the video source 12, in a direct or indirect fashion. The control system 40 may also be associated with a user interface 50, which may represent a display, monitor, keypad, mouse, remote control input, or the like.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   receiving a video signal for a video program with closed captioning from a video source, wherein the video signal is concurrently delivered to customer equipment by the video source;
   extracting original closed captioning text from the video signal;
   translating the original closed captioning text of a first language to translated closed captioning text of a second language; and
   sending closed captioning information comprising the translated closed captioning text toward the customer equipment.

2. The method of claim 1 wherein the customer equipment receives the video signal provided by the video source and displays the translated closed captioning text from the closed captioning information along with the video program.

3. The method of claim 2 wherein the closed captioning information and the video signal are received separately.

4. The method of claim 1 further comprising providing synchronization information with the closed captioning information to enable the customer equipment to display the translated closed captioning text at an appropriate time during the video program.

5. The method of claim 1 wherein the closed captioning information is provided to a plurality of customer equipment.

6. The method of claim 5 wherein the customer equipment is located at different locations associated with different subscribers.

7. A method comprising:
   receiving a video signal for a video program with closed captioning from a video source;
   extracting original closed captioning text from the video signal;
   translating the original closed captioning text of a first language to translated closed captioning text of a second language;
   encoding the translated closed captioning text as closed captioning into the video signal to create a modified video signal; and
   sending the modified video signal toward the customer equipment.

8. The method of claim 7 wherein the customer equipment receives the modified video signal, extracts the translated closed captioning text, and displays the translated closed captioning text during presentation of the video program.

9. The method of claim 7 wherein the modified video signal is provided to a plurality of customer equipment.

10. The method of claim 9 wherein the customer equipment is located at different locations associated with different subscribers.

11. A system comprising:
    at least one communication interface; and
    a control system associated with the at least one communication interface and adapted to:
    receive a video signal for a video program with closed captioning from a video source, wherein the video signal is concurrently delivered to customer equipment by the video source;
    extract original closed captioning text from the video signal;
    translate the original closed captioning text of a first language to translated closed captioning text of a second language; and
    send closed captioning information comprising the translated closed captioning text toward the customer equipment.

12. The system of claim 11 wherein the customer equipment receives the video signal provided by the video source and displays the translated closed captioning text from the closed captioning information along with the video program.

13. The system of claim 12 wherein the closed captioning information and the video signal are received separately.

14. The system of claim 11 wherein the control system is further adapted to provide synchronization information with the closed captioning information to enable the customer equipment to display the translated closed captioning text at an appropriate time during the video program.

15. The system of claim 11 wherein the closed captioning information is provided to a plurality of customer equipment.

16. The system of claim 15 wherein the customer equipment is located at different locations associated with different subscribers.

17. A system comprising:
    at least one communication interface; and
    a control system associated with the at least one communication interface and adapted to:
    receive a video signal for a video program with closed captioning from a video source;
    extract original closed captioning text from the video signal;
    translate the original closed captioning text of a first language to translated closed captioning text of a second language;
    encode the translated closed captioning text as closed captioning into the video signal to create a modified video signal; and
    send the modified video signal toward the customer equipment.

18. The system of claim 17 wherein the customer equipment receives the modified video signal, extracts the translated closed captioning text, and displays the translated closed captioning text during presentation of the video program.

19. The system of claim 17 wherein the modified video signal is provided to a plurality of customer equipment.

20. The system of claim 19 wherein the customer equipment is located at different locations associated with different subscribers.

* * * * *